United States Patent
Williams et al.

(10) Patent No.: US 9,701,178 B2
(45) Date of Patent: Jul. 11, 2017

(54) CABIN AIR FILTER

(71) Applicant: K&N Engineering, Inc., Riverside, CA (US)

(72) Inventors: Steve Williams, Beaumont, CA (US); Jere James Wall, Helendale, CA (US); Amir Rosenbaum, Los Altos Hills, CA (US)

(73) Assignee: K&N Engineering, Inc., Riverside, CA (US)

( * ) Notice: Subject to any disclaimer, the term of this patent is extended or adjusted under 35 U.S.C. 154(b) by 78 days.

(21) Appl. No.: 14/668,772

(22) Filed: Mar. 25, 2015

(65) Prior Publication Data

US 2016/0280046 A1    Sep. 29, 2016

(51) Int. Cl.
  *B01D 46/00*  (2006.01)
  *F02M 35/08*  (2006.01)
  (Continued)

(52) U.S. Cl.
  CPC ......... *B60H 3/0658* (2013.01); *B01D 39/083* (2013.01); *B01D 39/086* (2013.01); *B60H 3/0035* (2013.01); *B60H 3/0071* (2013.01)

(58) Field of Classification Search
  CPC ................ B01D 46/00; B01D 46/0082; B01D 46/0035; F02M 35/08; F02M 35/024; F02M 35/086; C08K 5/01
  (Continued)

(56) References Cited

U.S. PATENT DOCUMENTS 6,565,620 B1 * 5/2003 Greeson ................. B60K 13/02
                                                        123/198 E
7,717,986 B2 * 5/2010 Lotgerink-Bruinenberg .............
                                                        B01D 39/163
                                                        442/289

(Continued)

OTHER PUBLICATIONS

KNFILTERS. K&N Cabin Air Filter Cleaning. YouTube. Sep. 19, 2014 [retrieved on Jun. 7, 2016.] Retrieved from Internet:URL:https://www.youtube.com/watch?v=WCDV5hKv8X4. entire video.

(Continued)

*Primary Examiner* — Jacob T Minskey
*Assistant Examiner* — Minh-Chau Pham
(74) *Attorney, Agent, or Firm* — Rutan & Tucker LLP; Hani Z. Sayed (57) ABSTRACT

An apparatus and a method are provided for a cabin air filter to remove airborne molecular contaminants and volatile organic compounds from a passenger compartment of a vehicle. The cabin air filter includes a supportive frame configured to suitably orient the cabin air filter within a ventilation system of the vehicle. The supportive frame having a shape and size suitable for supporting the cabin air filter within the ventilation system. A filter medium is retained within the supportive frame and configured to remove the airborne molecular contaminants and volatile organic compounds from air flowing through the ventilation system. The filter medium electrostatically attracts and agglomerates contaminants within the air flowing through the air filter. In some embodiments, the filter medium includes fibers treated with antimicrobial molecules configured to destroy microbes. In some embodiments, the filter medium includes fibrous materials configured to release a fragrance into the passenger compartment.

15 Claims, 5 Drawing Sheets

(51) Int. Cl.
    *C08K 5/01*         (2006.01)
    *F02M 35/024*    (2006.01)
    *B60H 3/06*        (2006.01)
    *B60H 3/00*        (2006.01)
    *B01D 39/08*      (2006.01)

(58) Field of Classification Search
    USPC ............ 55/495, 385.3; 95/278, 281; 96/233; 106/285; 427/244; 123/198 E
    See application file for complete search history.

(56) References Cited

U.S. PATENT DOCUMENTS

| | | | |
|---|---|---|---|
| 2002/0139251 A1* | 10/2002 | Simmons | ........... B01D 46/0036 96/134 |
| 2004/0013583 A1 | 1/2004 | Burkhardt | |
| 2007/0137480 A1* | 6/2007 | Bergeron | ................ A61L 9/205 95/79 |
| 2007/0140932 A1* | 6/2007 | Bergeron | ................ A61L 9/015 422/186.04 |
| 2007/0227358 A1* | 10/2007 | Takigawa | ............... B01D 53/02 96/11 |
| 2008/0264259 A1* | 10/2008 | Leung | ................ B01D 39/1623 96/143 |
| 2010/0296966 A1* | 11/2010 | Bae | ........................... A61L 2/16 422/4 |
| 2015/0314227 A1* | 11/2015 | Williams | ........... B01D 46/0082 95/281 |
| 2016/0089960 A1* | 3/2016 | Zhang | ..................... B60H 3/06 96/115 |

OTHER PUBLICATIONS

K&N Replacement Air Filters. K&N Engineering. Inc. Mar. 24, 2015. [retrieved on Jul. 5, 2016], Retrieved from Internet: https://web.archive.org/web/20150324073351/http://www.knfilters.com/filtercharger.htm>. entire document.

International Search Report for PCT/US2016/024097 dated Aug. 5, 2016.

* cited by examiner

CABIN AIR FILTER

FIELD

The field of the present disclosure generally relates to filter devices. More particularly, the field of the invention relates to an apparatus and a method for a cabin air filter to remove airborne molecular contaminants and volatile organic compounds from air within vehicle passenger compartments.

BACKGROUND

An air filter is a device typically comprising fibrous materials configured to remove solid particulates, such as dust, pollen, mold, and bacteria from air passing through the air filter. Air filters are used in applications where air quality is important, notably in building ventilation systems, in engines, as well as in vehicle passenger compartments.

A cabin air filter typically is a pleated-paper filter that is placed in an outside-air intake for a passenger compartment of a vehicle. Cabin air filters typically are uniquely shaped to fit into an available space within a ventilation system of the vehicle. The cabin air filter can greatly affect the effectiveness of the vehicle's air conditioning and heating performance. Clogged or dirty cabin air filters can significantly reduce airflow through the vehicle's ventilation system, as well as allow allergens and contaminants to enter into the vehicle's passenger compartment. A drawback to conventional cabin air filters is that although many believe cabin air filters are generally believed to be highly efficient, conventional cabin air filters typically have a relatively low Minimum Efficiency Reporting Value (MERV), and thus allow airborne molecular contaminants and volatile organic compounds (VOCs) to enter vehicle passenger compartments. Further, many manufacturers do not list MERV ratings for their cabin air filters, misleading many users to assume cabin air filters are HEPA filters.

Another drawback to conventional cabin air filters is that dirty or clogged cabin air filters typically are removed from the vehicle and discarded, and a new cabin air filter is then installed. Considering that there are millions of vehicles throughout the world, the volume of discarded air filters that could be eliminated from landfills is a staggering number. What is needed, therefore, is a cabin air filter configured to remove airborne molecular contaminants and VOCs without obstructing air flow through vehicle ventilation systems, and a cabin air filter which may be periodically cleaned and reused.

SUMMARY

An apparatus and a method are provided for a cabin air filter to remove airborne molecular contaminants and volatile organic compounds (VOCs) from a passenger compartment of a vehicle. The cabin air filter comprises a supportive frame having a shape and size suitable for orienting the cabin air filter within a ventilation system of the vehicle. A filter medium is retained within the supportive frame and configured to remove the airborne molecular contaminants and volatile organic compounds from air flowing through the ventilation system. In some embodiments, the filter medium comprises one or more layers of cotton gauze sandwiched between two epoxy-coated aluminum wire screens. The layers of cotton gauze preferably are treated with a suitable filter oil composition so as to enhance airflow and filtration of air flowing through microscopic fiber strands comprising the filter medium. In some embodiments, the filter medium is configured to electrostatically attract and agglomerate particle contaminants within the air flowing through the ventilation system. In some embodiments, the filter medium comprises fibers that are treated with antimicrobial molecules configured to electrostatically capture microbes and volatile organic compounds as small as substantially 0.001 microns in diameter. In some embodiments, the filter medium is further configured to release a fragrance into the air flowing through the ventilation system.

In an exemplary embodiment, an apparatus for a cabin air filter to remove airborne molecular contaminants and volatile organic compounds from a passenger compartment of a vehicle comprises a supportive frame comprising a shape and size suitable for orienting the cabin air filter within a ventilation system of the vehicle; and a filter medium retained within the supportive frame and configured to remove the airborne molecular contaminants and volatile organic compounds (VOCs) from air flowing through the ventilation system.

In another exemplary embodiment, the filter medium comprises at least one layer of cotton gauze sandwiched between two epoxy-coated aluminum wire screens, the at least one layer of cotton gauze being suitable for treatment with a filter oil composition to cause tackiness of microscopic fiber strands comprising the filter medium.

In another exemplary embodiment, the filter medium is configured to electrostatically attract and agglomerate particle contaminants within the air flowing through the ventilation system. In another exemplary embodiment, the filter medium comprises a central screen configured to be electrically charged, the central screen being covered on each side by at least one layer of fibers capable of being electrically polarized, each of the at least one layer of fibers being covered by a grounded wire screen, wherein upon positively charging the central screen the at least one layer of fibers polarizes particle contaminants within the air flowing through the ventilation system, thereby causing the contaminants to be electrostatically entrapped within the at least one layer of fibers.

In another exemplary embodiment, the filter medium comprises at least some fibers that are treated with a coating of antimicrobial molecules configured to destroy microbes, the antimicrobial molecules comprising positively charged molecules distributed around the entire circumference of each of the at least some fibers and configured to cooperate with polarized fibers within the filter medium. In another exemplary embodiment, the positively charged molecules are configured to electrostatically capture negatively charged microbes and volatile organic compounds as small as substantially 0.001 microns in diameter within the air flowing through the ventilation system.

In another exemplary embodiment, the filter medium is configured to electrostatically entrap particle contaminants and release a fragrance into the air flowing through the ventilation system, the filter medium comprising antimicrobial molecules configured to destroy entrapped particle contaminants, the filter medium comprising at least one substance configured to release the fragrance into air passing through the filter medium, wherein the at least one substance is located downstream of the antimicrobial molecules so as to avoid destruction of aromatic molecules by the antimicrobial molecules.

In an exemplary embodiment, a cabin air filter for a vehicle passenger compartment comprises a supportive frame configured to suitably orient the cabin air filter within a ventilation system of the vehicle; and a filter medium retained within the supportive frame and configured to electrostatically attract and agglomerate airborne molecular contaminants and volatile organic compounds (VOCs) within air flowing through the ventilation system.

In another exemplary embodiment, the filter medium comprises a positively charged central screen, the central screen being covered on each side by at least one layer of polarized fibers, each of the at least one layer of polarized fibers being covered by a grounded wire screen, wherein the positively charged central screen and the at least one layer of fibers polarizes particle contaminants within the air flowing through the ventilation system, thereby entrapping the particle contaminants within the at least one layer of polarizable fibers. In another exemplary embodiment, the filter medium comprises at least some fibers that are treated with a coating of positively charged molecules configured to electrostatically capture and destroy negatively charged microbes and volatile organic compounds as small as substantially 0.001 microns in diameter within the air flowing through the ventilation system. In another exemplary embodiment, the filter medium comprises at least one substance configured to release a fragrance into air passing through the filter medium, wherein the at least one substance is located downstream of the positively charged molecules so as to avoid destruction of aromatic molecules by the positively charged molecules.

In another exemplary embodiment, at least a portion of the filter medium comprises at least one layer of cotton gauze configured for treatment with a filter oil composition to enhance airflow and filtration of air flowing through microscopic fiber strands comprising the filter medium. In another exemplary embodiment, the filter oil composition comprises a first portion comprising paraffinic oil by volume of the composition, a second portion comprising polyalphaolefin (PAO) by volume of the composition, and a third portion comprising red dye by volume of the composition.

In an exemplary embodiment, a method for cleaning a cabin air filter which is installed within a ventilation system of a vehicle comprises removing the cabin air filter from the ventilation system, clearing the ventilation system of any debris trapped therein; flushing contaminants from the filter medium by way of a water hose; allowing the water and contaminants to drain from the filter medium; and allowing the filter medium to dry.

In another exemplary embodiment, at least a portion of the filter medium comprises at least one layer of cotton gauze configured for treatment with a filter oil composition comprising a first portion comprising paraffinic oil by volume of the composition, a second portion comprising polyalphaolefin (PAO) by volume of the composition, and a third portion comprising red dye by volume of the composition. In another exemplary embodiment, flushing contaminants from the filter medium further comprises using a solvent to remove a filter oil composition from the filter medium. In another exemplary embodiment, allowing the filter medium to dry further comprises uniformly applying a filter oil composition to the filter medium and allowing the filter oil to wick into the filter medium.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first filter," may be made. However, the specific numeric reference should not be interpreted as a literal sequential order but rather interpreted that the "first filter" is different than a "second filter." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a cabin air filter to remove airborne molecular contaminants and volatile organic compounds (VOCs) from a passenger compartment of a vehicle. The cabin air filter comprises a supportive frame configured to suitably orient the cabin air filter within a ventilation system of the vehicle. The supportive frame comprises a shape and size suitable for supporting the cabin air filter within the ventilation system. A filter medium is retained within the supportive frame and configured to remove the airborne molecular contaminants and volatile organic compounds from air flowing through the ventilation system. The filter medium is configured to electrostatically attract and agglomerate particle contaminants within the air flowing through the ventilation system. In some embodiments, the filter medium comprises at least some fibers that are treated with a coating of antimicrobial molecules configured to destroy microbes on contact. In some embodiments, the filter medium comprises fibrous materials treated with at least one substance configured to release a fragrance into air passing through the filter medium.

Figure 1:
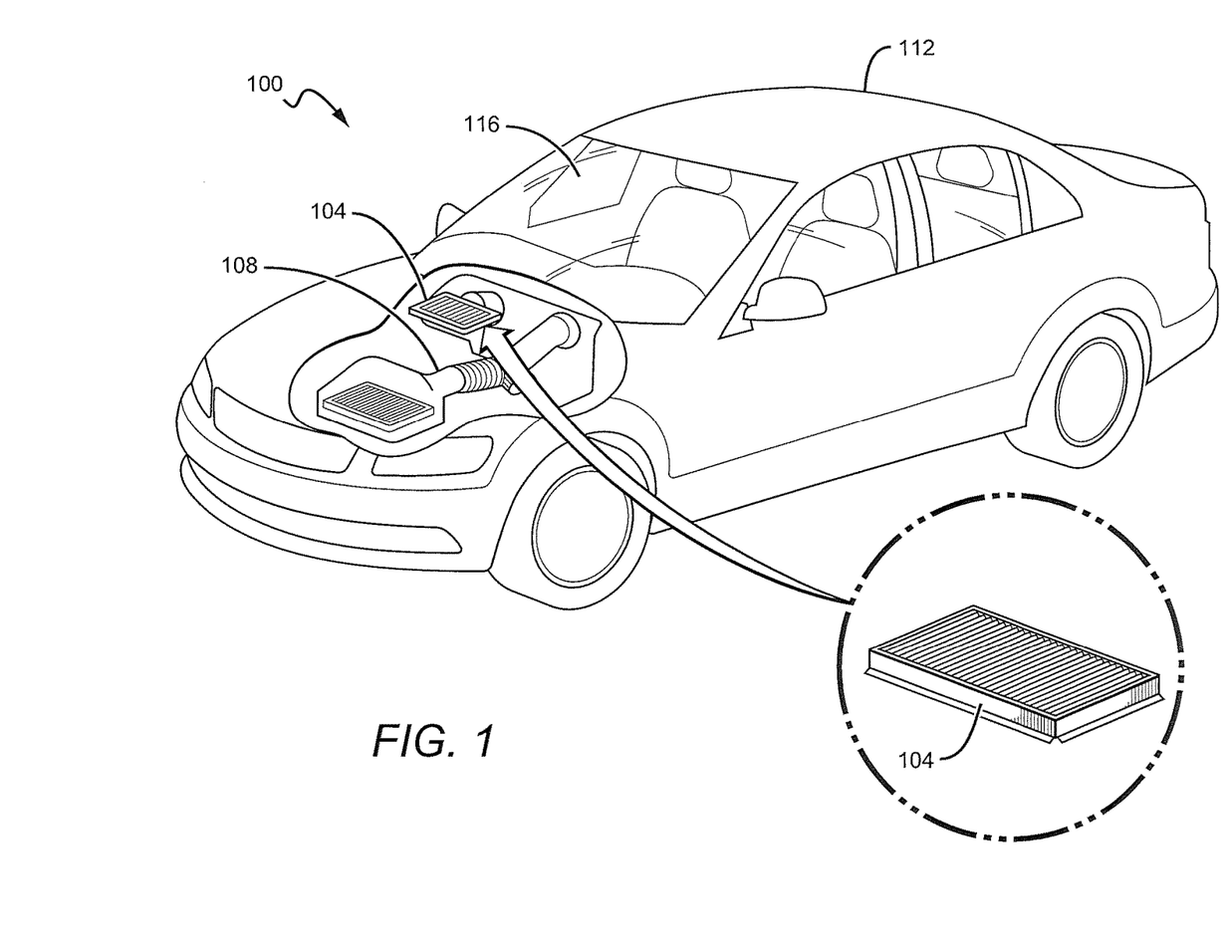
FIG. 1 illustrates a perspective ghost view of an exemplary use environment wherein a cabin air filter is incorporated into a ventilation system of a vehicle, according to the present disclosure.
Figure 2:
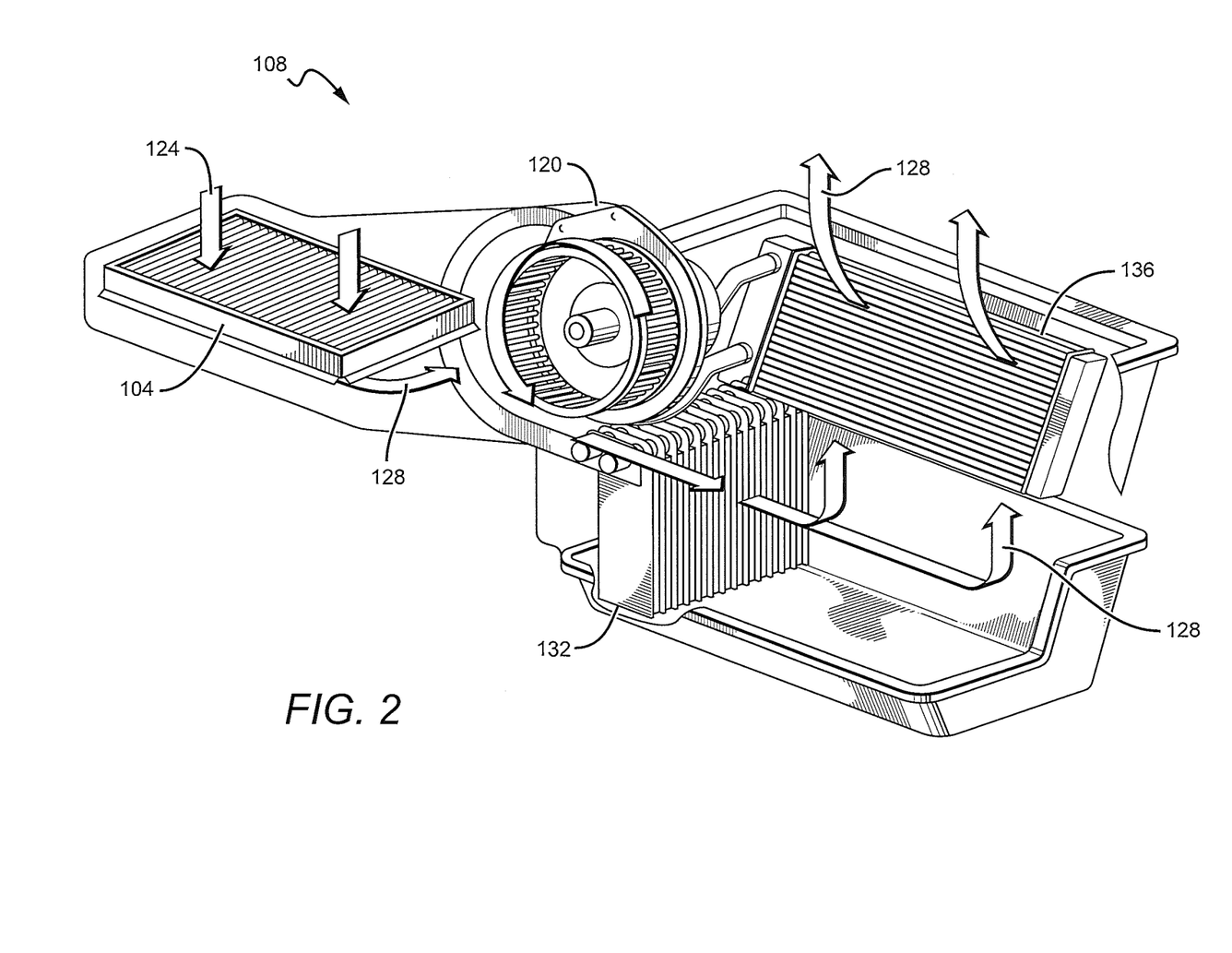
FIG. 2 illustrates a perspective ghost view of an exemplary embodiment of a ventilation system comprising a cabin air filter in accordance with the present disclosure.

FIG. 1 illustrates an exemplary use environment 100 wherein a cabin air filter 104 is incorporated into a ventilation system 108 of a vehicle 112 so as to clean outside air drawn through the air filter 104 into a passenger compartment 116. As shown in FIG. 2, the ventilation system 108 generally comprises a fan 120 configured to draw an outside air stream 124 through the air filter 104 whereby airborne molecular contaminants, volatile organic compounds, and other particle contaminants are removed from the air stream. Particle contaminants removed from the outside air stream 124 are entrapped in the air filter 104. The fan 120 then pushes a clean air stream 128 into an air conditioning system 132 or a heater core 136 and then into the passenger compartment 116.

It will be appreciated that in some embodiments, the air stream 124 may comprise air drawn from within the passenger compartment 116 rather than outside air. For example, a driver or a passenger may switch the ventilation system 108 to circulate air within the passenger compartment 116, thereby preventing outside air from entering passenger compartment 116. It should be understood, therefore, that in some embodiments the air filter 104 may be implemented so as to remove airborne molecular contaminants, volatile organic compounds, and other particle contaminants from interior air within the passenger compartment 116 being circulated through the ventilation system 108.

Figure 3:
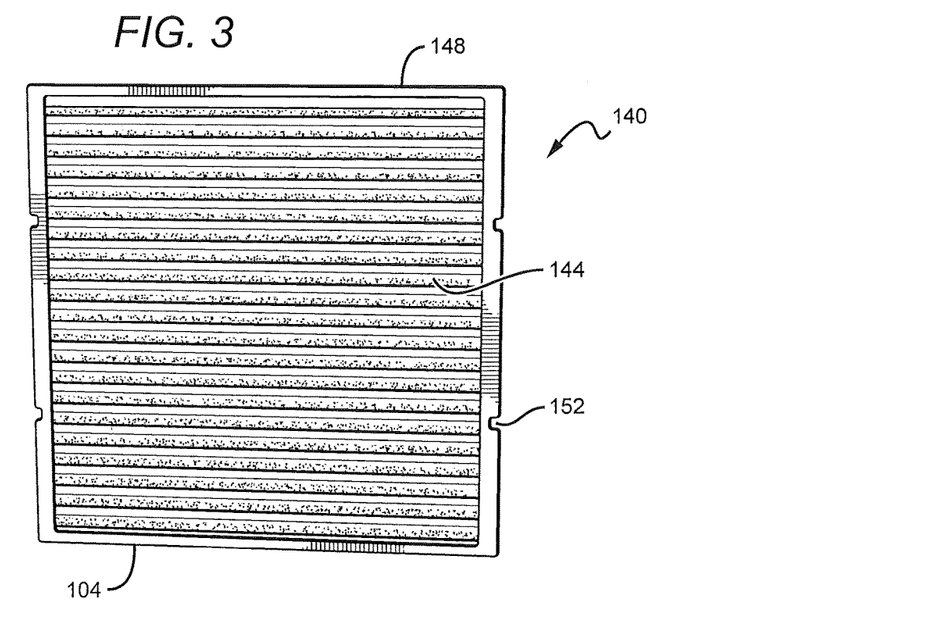
FIG. 3 illustrates an exemplary embodiment of a cabin air filter, according to the present disclosure.

FIG. 3 illustrates an exemplary embodiment 140 of a cabin air filter 104 according to the present disclosure. The cabin air filter 104 generally comprises a filter medium 144 within a supportive frame 148. The supportive frame 148 is configured to orient the cabin air filter 104 within the ventilation system 108 such that the air stream 124 is directed through the filter medium 144. As such, the supportive frame 148 comprises a shape and size suitable for supporting the cabin air filter 104 within the ventilation system 108. It will be appreciated that the shape and size of the supportive frame 148 will vary depending upon the make and model of the vehicle 112 for which the filter 104 is intended to be used.

Figure 4:
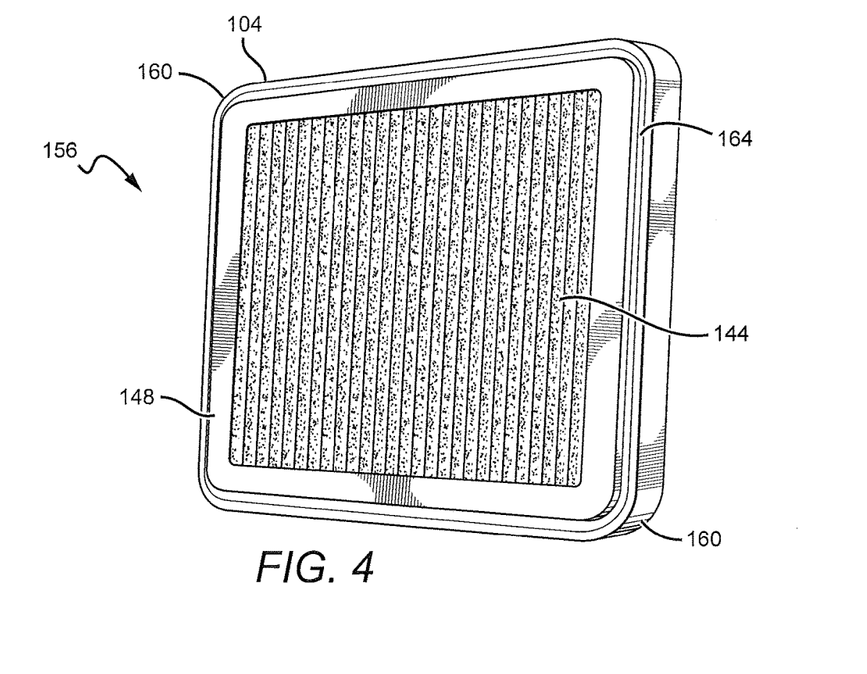
FIG. 4 illustrates an exemplary embodiment of a cabin air filter in accordance with the present disclosure.

The supportive frame 148 may comprise various fastening structures suitably configured for securing the cabin air filter 104 within a particular ventilation system 108. To this end, in the embodiment illustrated in FIG. 3, the supportive frame 148 comprises a plurality of notches 152 configured to interface with protrusions within the ventilation system 108 of the vehicle 112. In another exemplary embodiment 156, illustrated in FIG. 4, the supportive frame 148 comprises rounded corners 160 and a ridge 164 configured to orient the cabin air filter 104 within the ventilation system 108 of a particular make and model of automobile. Further, the supportive frame 148 illustrated in FIG. 4 has a different shape than the shape of the supportive frame illustrated in FIG. 3. It should be understood, therefore, that the various structures and shapes incorporated into the supportive frame 148, and thus the cabin air filter 104 as a whole, will vary depending upon the make and model of the vehicle 112 for which the cabin air filter 104 is intended to be used without detracting from the spirit and scope of the present disclosure.

It will be appreciated that the filter medium 144 generally is retained within the supportive frame 148. It is contemplated that any of a variety of fasteners may be used to retain the filter medium 144 within the supportive frame 148. In some embodiments, the supportive frame 148 may be molded to a wire support of the filter medium 144. In some embodiments, the supportive frame 148 may comprise a crimped portion that folds onto and retains the wire support and the filter medium 144 of the cabin air filter 104. It will be appreciated that by those skilled in the art that fastening the filter medium 144 to the supportive frame 148 renders the filter medium 144 irremovable from the supportive frame 148.

It is contemplated that a user of the cabin air filter 104 may periodically clean the filter medium 144 rather than replacing the cabin air filter 104, as is typically done with conventional cabin air filter systems. It is envisioned that the cabin air filter 104 may be removed from the ventilation system 108, the ventilation system 108 cleaned of any debris trapped therein, and then a water hose used to flush contaminants from the filter medium 144, thereby leaving the filter clean and ready for reuse. In some embodiments, wherein the filter medium 144 comprises a filter oil composition, a solvent may be used to remove the oil from the filter medium 144. Once the filter medium 144 is completely dry, a suitably formulated filter oil composition may be uniformly applied and allowed to wick into the filter medium 144. Various other cleaning methods will be apparent to those skilled in the art without deviating from the spirit and scope of the present disclosure.

In some embodiments, the filter medium 144 comprises 4 to 6 layers of cotton gauze sandwiched between two epoxy-coated aluminum wire screens. The cotton is advantageously treated with the above-mentioned suitably formulated filter oil composition for causing tackiness throughout microscopic strands comprising the filter medium 144. The nature of the cotton allows high volumes of airflow, and when combined with the tackiness of the filter oil composition creates a powerful filtering medium which ensures a high degree of air filtration.

During operation of the ventilation system 108, contaminant particles cling to the fibers within the volume of the filter medium 144 and become part of the filtering medium 144, a process referred to as "depth loading." It will be appreciated that depth loading allows the cabin air filter 104 to capture and retain significantly more contaminants per unit of area than conventional cabin air filters. Contaminants collected on the surface of the cabin air filter 104 have little effect on air flow during much of the filter's service life because there are no small holes for the contaminants to clog. Contaminant particles are stopped by the layers of cotton gauze and held in suspension by the filter oil composition. Moreover, as the cabin air filter 104 collects an increasing volume of contaminants and debris, an additional form of filtering action begins to take place because the outside air must first pass through the trapped contaminants on the surface of the filter medium 144 before passing through deeper layers within the filter medium 144. In essence, the trapped contaminants begin to operate as a filter material which precedes the filter medium 144. Thus, the cabin air filter 104 continues to exhibit a high degree of air flow and filtration throughout the service life of the filter.

It will be appreciated that treating the filter medium 144 with the filter oil composition generally enables the filter medium 144 to capture contaminants by way of interception, whereby contaminants, such as by way of non-limiting example, dirt particles, traveling with the air stream 124 directly contact the fibers comprising the filter medium 144 and are then held in place by the filter oil composition. Larger or heavier particles are generally captured by way of impaction, whereby the inertia or momentum of the particles causes them to deviate from the path of the air stream 124 through the filter medium 144, and instead the particles run straight into the fibers and are captured by the filter oil composition.

Particle contaminants having very small sizes may be captured by way of diffusion. As will be appreciated, small particles are highly affected by forces within the air stream 124 through the filter medium 144. Forces due to velocity changes, pressure changes, and turbulence caused by other particles, as well as interaction with air molecules, generally causes the small particles to follow random, chaotic flow paths through the filter medium 144. Consequently, the small particles do not follow the air stream 124, and their erratic motion causes them to collide with the fibers comprising the filter medium 144 and remain captured by the filter oil composition. Diffusion and the filter oil composition enable the cabin air filter 104 to capture particle contaminants having sizes that are much smaller than the openings between the fibers comprising the filter medium 144. Furthermore, the filter oil composition enables the cabin air filter 104 to capture contaminants throughout the volume of the filter medium 144, rather than only on the surface of the filter as is common with conventional cabin air filters. The multiple layers of cotton fibers comprising the filter medium 144 coupled with the tackiness provided by the filter oil composition provide many levels of contaminant retention, thereby enabling the cabin air filter 104 to hold significantly more contaminants per unit of area of the filter medium 144 than is possible with conventional cabin air filters.

As will be appreciated, the filter oil composition of the present disclosure is critical to the enhanced air flow and filtration properties of the cabin air filter 104. In some embodiments, the filter oil composition comprises an oil formulation which is non-reactive, has an excellent oxidation stability, possesses good thermal stability, and retains suitable viscosity at normal operating temperatures of the ventilation system 108. In some embodiments, the filter oil composition may be a mixture of oils and dyes (to provide color) suitable for enhancing the tackiness of the filter medium 144, such as by way of non-limiting example, paraffinic oils, polyalphaolefins, and the like. In some embodiments, the filter oil composition comprises a mixture of 96.74% paraffinic oil by volume, 3.20% polyalphaolefin (PAO) by volume, and 0.06% red dye by volume. In some embodiments, the filter oil composition has a viscosity at 100 degrees-C ranging between substantially 7.2 and 7.6 centistokes (cSTs). It is to be understood that the particular oils and dyes, as well as their colors or viscosities, and their individual concentrations within the filter oil composition may be altered without deviating from the spirit and the scope of the present disclosure.

Figure 5:
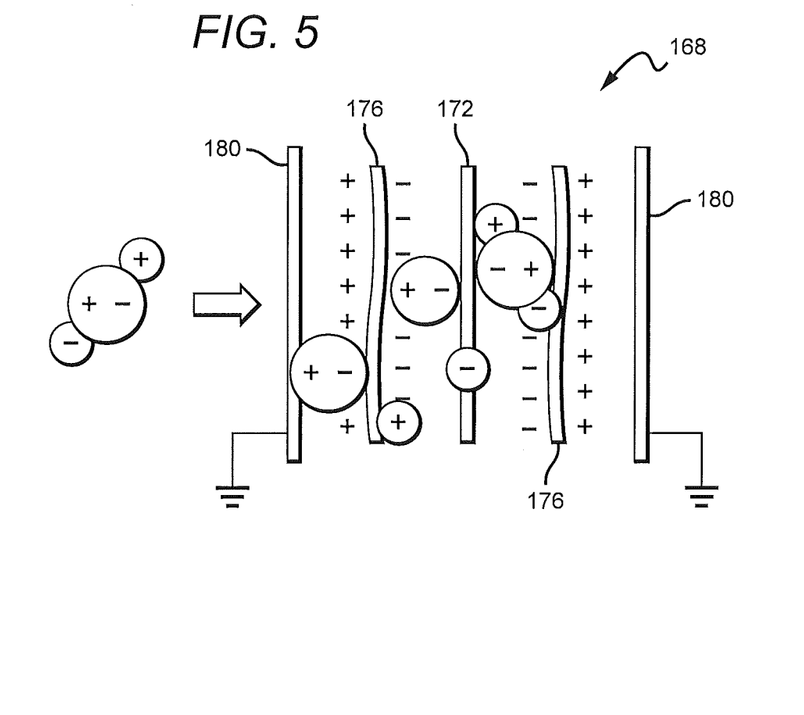
FIG. 5 illustrates a cross-sectional view of an exemplary embodiment of a filter medium configured for entrapping particle contaminants by way of electrostatic attraction and agglomeration.

FIG. 5 illustrates a cross-sectional view of an exemplary embodiment 168 of a filter medium 144 configured for entrapping contaminant particles possessing diameters less than 0.3 microns. In the embodiment illustrated in FIG. 5, the filter medium 144 utilizes electrostatic attraction and agglomeration to entrap particle contaminants. The filter medium 144 comprises a central screen 172 configured to be electrically charged to a high electrostatic potential. In some embodiments, the central screen 172 is positively charged to substantially 7,000 VDC. The central screen 172 is covered on each side by at least one layer of fibers 176 capable of being electrically polarized. As shown in FIG. 5, each of the at least one layer of polarizable fibers 176 is covered by an exterior grounded wire screen 180. It will be appreciated that upon positively charging the central screen 172, the polarizable fibers 176 operate to polarize incoming particle contaminants within the air stream 124, thereby causing the contaminants to become electrostatically attracted to the polarizable fibers 176. Thus, particle contaminants that would otherwise avoid directly colliding with the fibers 176 are electrostatically captured and entrapped within the filter medium 144.

Figure 6:
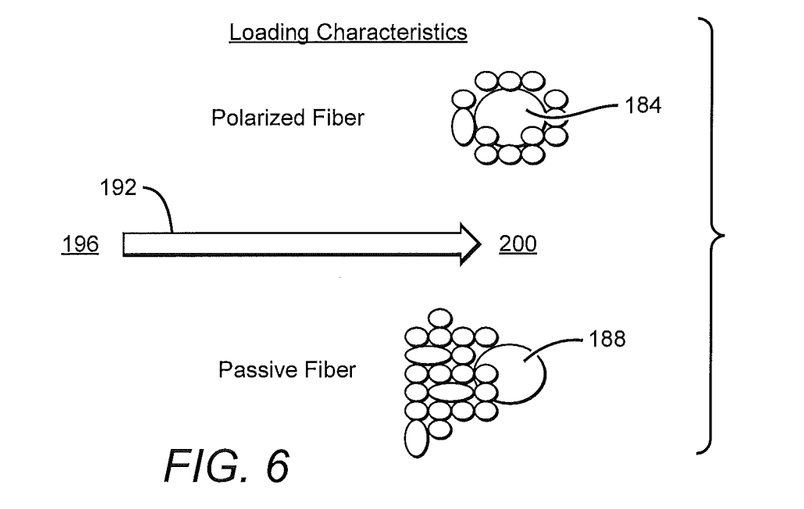
FIG. 6 illustrates cross-sectional views of an exemplary embodiment of a polarized fiber and an unpolarized passive fiber being exposed to particulate contaminants within an air stream that flows from an upstream area to a downstream area.

FIG. 6 illustrates cross-sectional views of a polarized fiber 184 and an unpolarized passive fiber 188 being exposed to particle contaminants within an air stream 192 that flows from an upstream area 196 to a downstream area 200. As shown in FIG. 6, electrostatic attraction between the particle contaminants and the polarized fiber 184 uniformly distributes the contaminants on the surface of the polarized fiber 184. The electrostatic attraction ensures the capture of contaminants that would otherwise pass by the fiber 184 without a direct collision and continue flowing to the downstream area 200. Unlike the polarized fiber 184, the unpolarized passive fiber 188 relies upon direct collisions between the particle contaminants and the fiber, thus allowing non-colliding contaminants to continue flowing to the downstream area 200.

Figure 7:
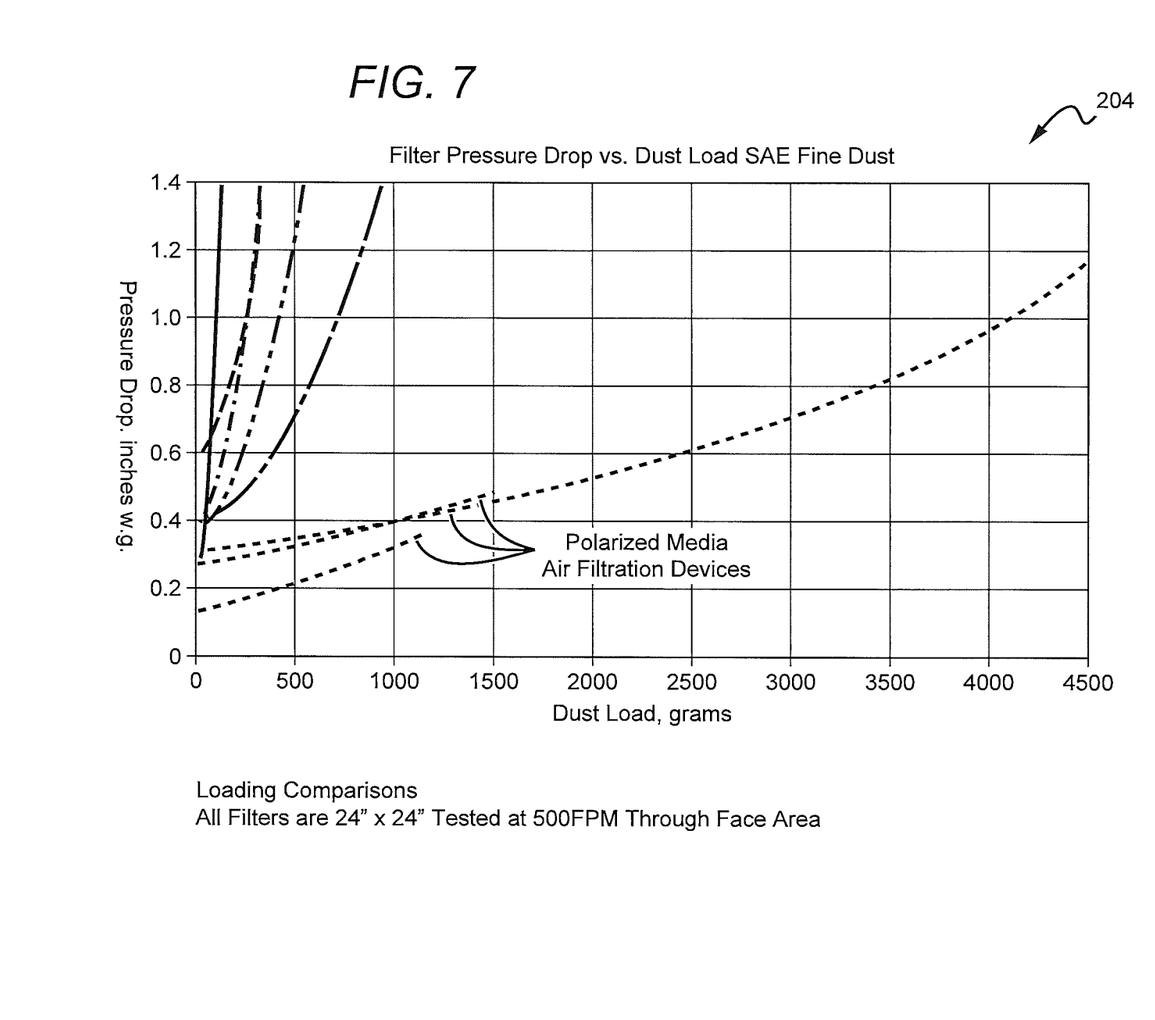
FIG. 7 illustrates a graph showing an experimentally determined relationship between fine dust loading and a drop in pressure across each of several air filter devices.

As further illustrated in FIG. 6, the contaminants that collide with the passive fiber 188 tend to accumulate on an upstream side of the passive fiber 188. It will be appreciated that as the accumulation of contaminants on the upstream side of the passive fiber 188 grows, the air stream 192 becomes proportionally restricted. Thus, filter mediums 144 comprising unpolarized passive fibers 188 are prone to clogging and greater loading than generally occurs with filter mediums 144 comprising polarized fibers 184. FIG. 7 illustrates a graph 204 showing an experimentally determined relationship between fine dust loading and a consequent drop in pressure across each of several air filter devices. FIG. 7 clearly demonstrates that filter media 144 comprising polarized fibers 184 entrap more contaminants with a lower pressure drop across the filter than is otherwise possible with conventional filter media comprising unpolarized passive fibers 188.

As will be appreciated, experimentally testing the performance of each air filter, as demonstrated in FIG. 7, enables manufacturers of cabin air filters to assign Minimum Efficiency Reporting Value (MERV) ratings to each air filter. Manufacturer assigned MERV ratings enable potential users to select cabin air filters, as described herein, based on experimentally determined air filter performance rather than relying on an assumed level of high performance as often occurs with conventional cabin air filters.

In some embodiments, at least some of the fibers comprising the filter medium 144 are treated with a coating of antimicrobial molecules configured to destroy microbes on contact. Preferably, the coating of antimicrobial molecules surrounds the entire circumference of each fiber strand that is treated. In some embodiments, the antimicrobial molecules comprise positively charged molecules that are configured to cooperate with the polarized fibers 176 of the filter medium 144. It is contemplated that since many microbes and volatile organic compounds are negatively charged, incorporating the antimicrobial molecules into the filter medium 144 will electrostatically capture the particle contaminants, thereby enabling the cabin air filter 104 to remove particles from the air stream 124 as small as 0.001 microns in diameter, or smaller, such as many odors, irritants, toxic compounds, and the like.

In some embodiments, the fibrous materials comprising the filter medium may comprise at least one substance configured to release a fragrance into air passing through the filter medium 144. Thus, in some embodiments, the cabin air filter 104 is configured to introduce a desired aroma into the passenger compartment 116. It is contemplated that various cabin air filters 104 may comprise different fragrances, thereby enabling a user to select a cabin air filter 104 according to a desired aroma. In some embodiments, a particular scent or aroma may be distributed throughout the ventilation system 108 and the passenger compartment 116 so as to provide an aroma therapy by way of the cabin air filter 104.

In some embodiments, the at least one substance configured to release a fragrance is incorporated into the filter medium 144 comprising antimicrobial molecules. Thus, in some embodiments, the filter medium 144 utilizes electrostatic attraction to entrap particle contaminants while simultaneously releasing an aroma into the passenger compartment 116. It will be appreciated, however, that the substances for releasing a fragrance preferably are located within the filter medium 144 downstream of the antimicrobial molecules so as to avoid destruction of aromatic molecules by the antimicrobial molecules.

It is contemplated that the fragrance may be any natural substance, synthetic material, (incorporating aldehydes, ketones, esters, and other chemical constituents), or combinations thereof which is known in the art and suitable for use in candles for imparting an odor, aroma, or fragrance. In some embodiments, suitable natural and synthetic fragrance/flavor substances may include those compiled by the U.S. Food and Drug Administration in Title 21 of the Code of Federal Regulations, Sections 172.510 and 172.515 respectively. In some embodiments, suitable fragrances may comprise spice oil, flower oil, fruit oil, and the like. In some embodiments, suitable fragrances may comprise fragrance components, such as for example benzaldehydes, phenols, cinnamic aldehydes and esters, octadienes, dienes, cyclohexadienes, terpenes, and the like. Further details regarding dispersion of aromas into vehicle cabins and fragrance compositions are disclosed in U.S. patent application Ser. No. 10/544,157, entitled "Vehicle cabin air filter freshener," filed on Aug. 13, 2003, the entirety of each of which is incorporated herein by reference.

It should be understood that the cabin air filter 104 is not limited to car passenger compartments 116, but rather may be used for any enclosed space wherein passengers, drivers, as well as occupants reside, such as by way of non-limiting example, automobiles, trucks, recreational vehicles, buses, earthmoving equipment and tractors with enclosed cabins, crane operator cabins, various cargo moving vehicles, locomotives, rail passenger cars, airplanes, helicopters, ship cabins, airship cabins, and the like. Moreover, the cabin air filter 104 of the present disclosure is not to be limited to vehicles, but rather may be practiced in buildings and detached residential homes. For example, the cabin air filter 104 may be incorporated into a heating, ventilation, and air conditioning (HVAC) system so as to clean interior air being circulated within, or outside air being drawn into, a building or a residential home. It should be understood, therefore, that the cabin air filter of the present disclosure may be used with rooftop HVAC systems, central HVAC systems, wall-mounted HVAC systems, as well as portable HVAC systems, and the like.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An apparatus for a cabin air filter to remove airborne molecular contaminants and volatile organic compounds from a passenger compartment of a vehicle, comprising:
   a supportive frame comprising a shape and size suitable for orienting the cabin air filter within a ventilation system of the vehicle; and
   a filter medium retained within the supportive frame and configured to remove the airborne molecular contaminants and volatile organic compounds (VOCs) from air flowing through the ventilation system,
   wherein the filter medium comprises a central screen configured to be electrically charged, the central screen being covered on each side by at least one layer of fibers capable of being electrically polarized, each of the at least one layer of fibers being covered by a grounded wire screen, wherein upon positively charging the central screen the at least one layer of fibers polarizes particle contaminants within the air flowing through the ventilation system, thereby causing the contaminants to be electrostatically entrapped within the at least one layer of fibers.

2. The apparatus of claim 1, wherein the filter medium comprises at least one layer of cotton gauze sandwiched between two epoxy-coated aluminum wire screens, the at least one layer of cotton gauze being suitable for treatment with a filter oil composition to cause tackiness of microscopic fiber strands comprising the filter medium.

3. The apparatus of claim 1, wherein the filter medium is configured to electrostatically attract and agglomerate particle contaminants within the air flowing through the ventilation system.

4. The apparatus of claim 1, wherein the filter medium comprises at least some fibers that are treated with a coating of antimicrobial molecules configured to destroy microbes, the antimicrobial molecules comprising positively charged molecules distributed around the entire circumference of each of the at least some fibers and configured to cooperate with polarized fibers within the filter medium.

5. The apparatus of claim 4, wherein the positively charged molecules are configured to electrostatically capture negatively charged microbes and volatile organic compounds as small as substantially 0.001 microns in diameter within the air flowing through the ventilation system.

6. The apparatus of claim 1, wherein the filter medium is configured to electrostatically entrap particle contaminants and release a fragrance into the air flowing through the ventilation system, the filter medium comprising antimicrobial molecules configured to destroy entrapped particle contaminants, the filter medium comprising at least one substance configured to release the fragrance into air passing through the filter medium, wherein the at least one substance is located downstream of the antimicrobial molecules so as to avoid destruction of aromatic molecules by the antimicrobial molecules.

7. A cabin air filter for a vehicle passenger compartment, comprising:
- a supportive frame configured to suitably orient the cabin air filter within a ventilation system of the vehicle; and
- a filter medium retained within the supportive frame and configured to electrostatically attract and agglomerate airborne molecular contaminants and volatile organic compounds (VOCs) within air flowing through the ventilation system,
- wherein the filter medium comprises a central screen configured to be electrically charged, the central screen being covered on each side by at least one layer of fibers capable of being electrically polarized, each of the at least one layer of fibers being covered by a grounded wire screen, wherein upon positively charging the central screen the at least one layer of fibers polarizes particle contaminants within the air flowing through the ventilation system, thereby causing the contaminants to be electrostatically entrapped within the at least one layer of fibers.

8. The cabin air filter of claim 7, wherein the filter medium comprises at least some fibers that are treated with a coating of positively charged molecules configured to electrostatically capture and destroy negatively charged microbes and volatile organic compounds as small as substantially 0.001 microns in diameter within the air flowing through the ventilation system.

9. The cabin air filter of claim 8, wherein the filter medium comprises at least one substance configured to release a fragrance into air passing through the filter medium, wherein the at least one substance is located downstream of the positively charged molecules so as to avoid destruction of aromatic molecules by the positively charged molecules.

10. The cabin air filter of claim 7, wherein at least a portion of the filter medium comprises at least one layer of cotton gauze configured for treatment with a filter oil composition to enhance airflow and filtration of air flowing through microscopic fiber strands comprising the filter medium.

11. The cabin air filter of claim 10, wherein the filter oil composition comprises a first portion comprising paraffinic oil by volume of the composition, a second portion comprising polyalphaolefin (PAO) by volume of the composition, and a third portion comprising red dye by volume of the composition.

12. A method for cleaning a cabin air filter which is installed within a ventilation system of a vehicle, the method comprising:
- removing the cabin air filter from the ventilation system, wherein the cabin air filter includes a filter medium comprising a central screen configured to be electrically charged, the central screen being covered on each side by at least one layer of fibers capable of being electrically polarized, each of the at least one layer of fibers being covered by a grounded wire screen, wherein upon positively charging the central screen the at least one layer of fibers polarizes particle contaminants within the air flowing through the ventilation system, thereby causing the contaminants to be electrostatically entrapped within the at least one layer of fibers,
- clearing the ventilation system of any debris trapped therein;
- flushing contaminants from the filter medium by way of a water hose;
- allowing the water and contaminants to drain from the filter medium; and
- allowing the filter medium to dry.

13. The method of claim 12, wherein at least a portion of the filter medium comprises at least one layer of cotton gauze configured for treatment with a filter oil composition comprising a first portion comprising paraffinic oil by volume of the composition, a second portion comprising polyalphaolefin (PAO) by volume of the composition, and a third portion comprising red dye by volume of the composition.

14. The method of claim 12, wherein flushing contaminants from the filter medium further comprises using a solvent to remove a filter oil composition from the filter medium.

15. The method of claim 12, wherein allowing the filter medium to dry further comprises uniformly applying a filter oil composition to the filter medium and allowing the filter oil to wick into the filter medium.

* * * * *